(12) United States Patent
Yoshida et al.

(10) Patent No.: US 12,499,765 B2
(45) Date of Patent: Dec. 16, 2025

(54) INFORMATION PROCESSING DEVICE, SYSTEM, AND METHOD

(71) Applicant: TOYOTA JIDOSHA KABUSHIKI KAISHA, Toyota (JP)

(72) Inventors: Kaoru Yoshida, Nisshin (JP); Masatoshi Kakutani, Miyoshi (JP); Masataka Okuda, Toyota (JP); Hiroki Maki, Toyota (JP); Kosuke Watanabe, Toyota (JP); Kanade Kuriyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 18/344,941

(22) Filed: Jun. 30, 2023

(65) Prior Publication Data

US 2024/0071227 A1    Feb. 29, 2024

(30) Foreign Application Priority Data

Aug. 30, 2022    (JP) .................. 2022-137114

(51) Int. Cl.
*G08G 1/16*    (2006.01)
*G08G 1/01*    (2006.01)

(52) U.S. Cl.
CPC ........... *G08G 1/163* (2013.01); *G08G 1/0112* (2013.01)

(58) Field of Classification Search
None
See application file for complete search history.

(56) References Cited

U.S. PATENT DOCUMENTS

| | | | |
|---|---|---|---|
| 2020/0314389 A1 | 10/2020 | Sakurada et al. | |
| 2021/0300361 A1 | 9/2021 | Sugae et al. | |
| 2022/0012504 A1 | 1/2022 | Liu et al. | |
| 2023/0324917 A1* | 10/2023 | Kitai | G01S 17/42 701/28 |

FOREIGN PATENT DOCUMENTS

| | | |
|---|---|---|
| JP | 2006058135 A | 3/2006 |
| JP | 2020166584 A | 10/2020 |
| JP | 2021136597 A | 9/2021 |
| JP | 2021162926 A | 10/2021 |

OTHER PUBLICATIONS

Mahmoud, Esam Goda et al., "The Future of Digital Twins for Autonomous Systems: Analysis and Opportunities," Apr. 21, 2022, Springer, Studies in Systems, Decision and Control vol. 423, pp. 187-200 (Year: 2022).*

* cited by examiner

*Primary Examiner* — Madison R. Inserra
(74) *Attorney, Agent, or Firm* — Dickinson Wright, PLLC

(57) ABSTRACT

An information processing device mounted on a vehicle including a sensor includes an acquisition unit that acquires a surrounding image of the vehicle and information related to a behavior of the vehicle from the sensor, and an identification unit that identifies a moving object in the surrounding image of the vehicle based on a chronological change of the surrounding image of the vehicle and the information related to the behavior of the vehicle.

6 Claims, 11 Drawing Sheets

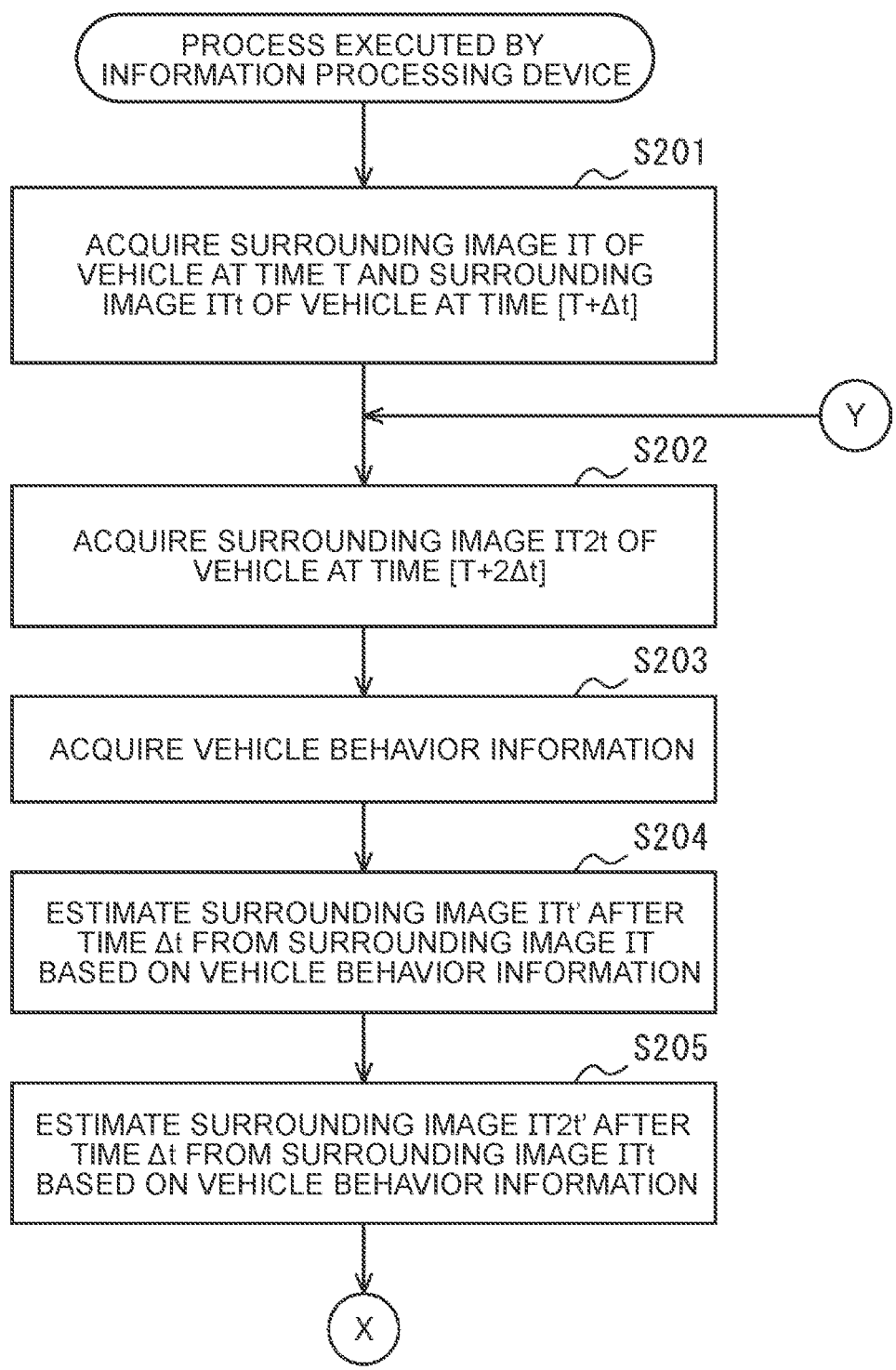

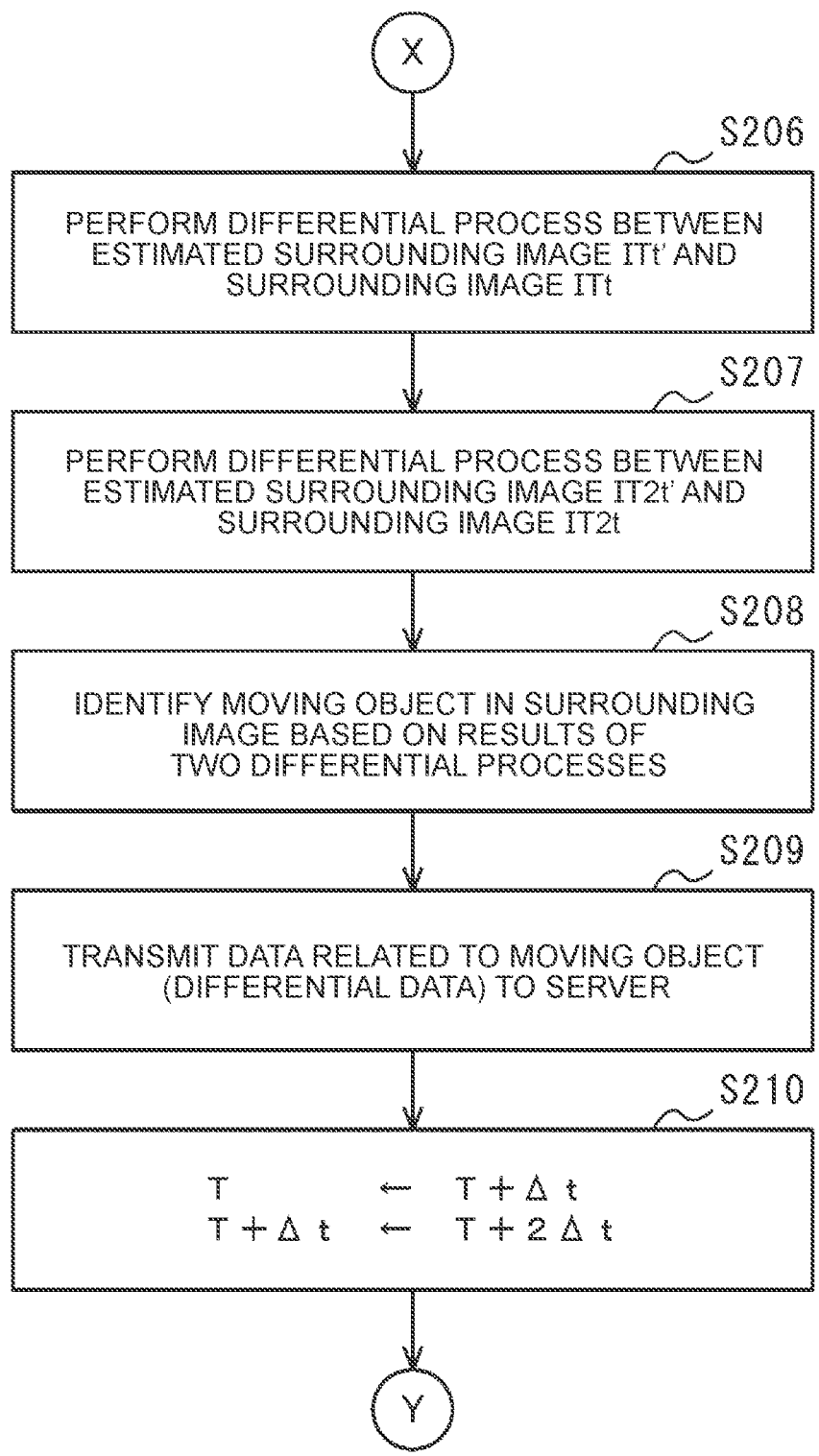

<SURROUNDING IMAGE IT AT TIME T>

<SURROUNDING IMAGE ITt AT TIME [T+Δt]>

<SURROUNDING IMAGE IT2t AT TIME [T+2Δt]>

<ESTIMATED SURROUNDING IMAGE ITt' AFTER TIME Δt>

<ESTIMATED SURROUNDING IMAGE IT2t' AFTER TIME 2Δt>

<DIFFERENCE BETWEEN SURROUNDING IMAGE ITt AND
ESTIMATED SURROUNDING IMAGE ITt'>

<DIFFERENCE BETWEEN SURROUNDING IMAGE IT2t AND
ESTIMATED SURROUNDING IMAGE IT2t'>

INFORMATION PROCESSING DEVICE, SYSTEM, AND METHOD

CROSS-REFERENCE TO RELATED APPLICATION

This application claims priority to Japanese Patent Application No. 2022-137114 filed on Aug. 30, 2022, incorporated herein by reference in its entirety.

BACKGROUND

1. Technical Field

The present disclosure relates to an information processing device and the like mounted on a vehicle including a sensor.

2. Description of Related Art

Japanese Unexamined Patent Application Publication No. 2006-058135 (JP 2006-058135 A) discloses a moving body detector that can judge whether a target is a moving body or a stationary body even in a situation where a vehicle is traveling. The moving body detector detects the target using a difference frequency spectrum obtained by a sensor that sends a signal to the front space and receives a signal reflected by the front target. Accordingly, it is possible to judge whether the detected target is a moving body or a stationary body even in a situation where the vehicle is traveling.

SUMMARY

In recent years, imaging devices such as cameras capable of acquiring images have been increasing as sensors mounted on vehicles. In the future, it is desirable to be able to identify, based on an image of the surroundings of the vehicle that is acquired by the vehicle using an image sensor such as the in-vehicle camera while the vehicle is moving, a moving object that is present in the image.

The present disclosure has been made in view of the above issue, and an object of the present disclosure is to provide an information processing device and the like that can identify a moving object at the surroundings of a vehicle from an image captured by an image sensor in the moving vehicle.

In order to solve the above issue, one aspect of the technology of the present disclosure is an information processing device mounted on a vehicle including a sensor, and the information processing device includes an acquisition unit that acquires a surrounding image of the vehicle and information related to a behavior of the vehicle from the sensor, and an identification unit that identifies a moving object in the surrounding image of the vehicle based on a chronological change of the surrounding image of the vehicle and the information related to the behavior of the vehicle.

According to the information processing device etc. of the present disclosure above, even in a case where the vehicle equipped with various sensors including an image sensor such as a camera is moving, it is possible to identify the moving object based on the chronological change of the image and the information related to the behavior of the vehicle acquired from the sensors.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a flowchart of a moving object identification process executed by the information processing device;

FIG. 2B is a flowchart of the moving object identification process executed by the information processing device;

DETAILED DESCRIPTION OF EMBODIMENTS

An information processing device and the like of the present disclosure identify a moving object in a captured surrounding image of a vehicle based on a chronological change of the surrounding image of the vehicle that is acquired from an image sensor and information related to the behavior of the vehicle that is acquired from a vehicle speed sensor and a steering angle sensor, etc. The moving object is identified based on the chronological change of the surrounding image while grasping the movement of the image sensor in consideration of the behavior of the vehicle. Therefore, the moving object can be accurately identified even from the surrounding image captured while the vehicle is moving. Hereinafter, an embodiment of the present disclosure will be described in detail with reference to the drawings.

Embodiment

Configuration

Figure 1:
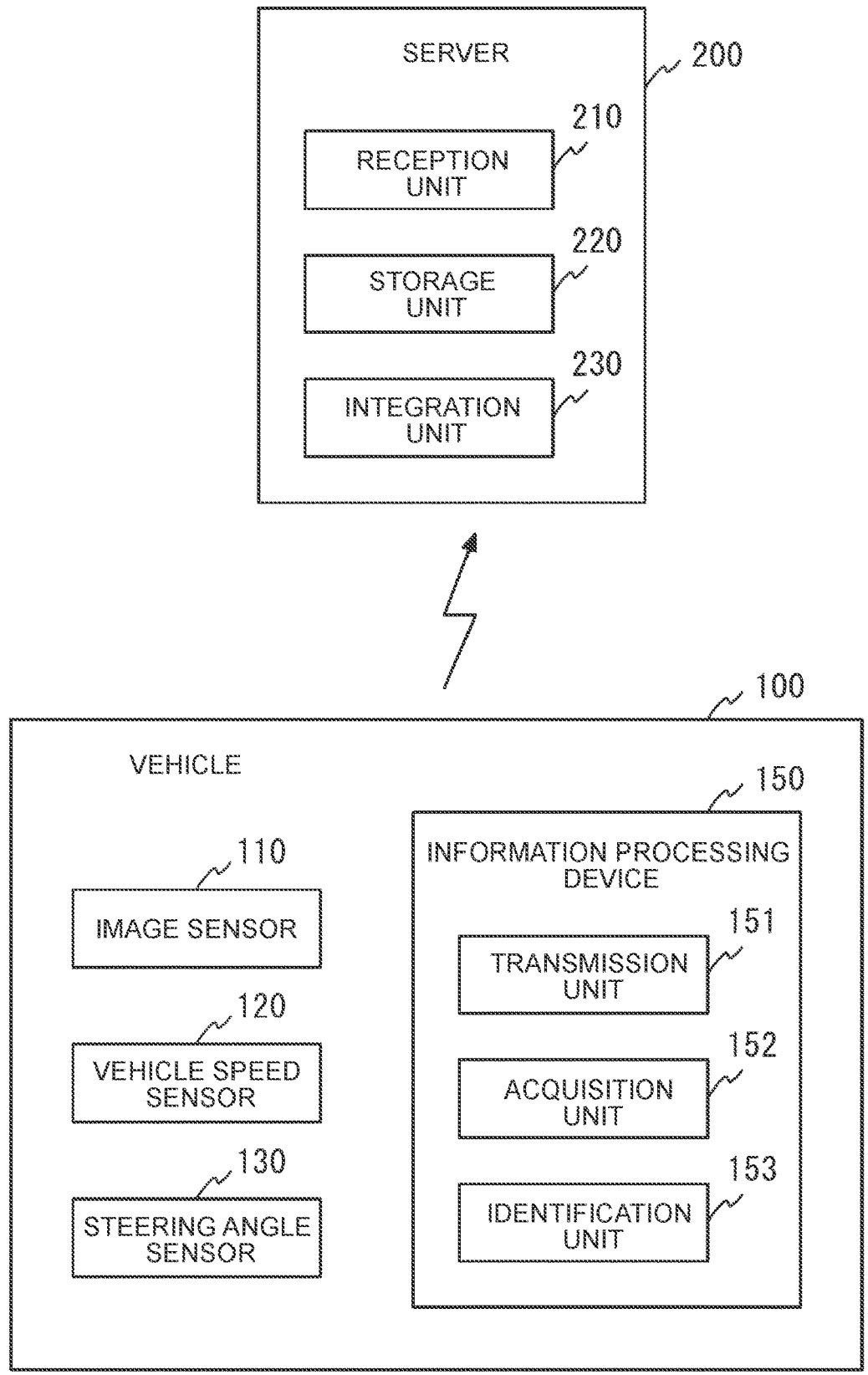
FIG. 1 is a schematic configuration diagram of a system including an information processing device according to an embodiment of the present disclosure.

FIG. 1 is a block diagram showing an example of a schematic configuration of a system including an information processing device 150 according to an embodiment of the present disclosure. The system illustrated in FIG. 1 is configured by including a vehicle 100 on which the information processing device 150 is mounted and a server 200, and is capable of providing predetermined data obtained in the vehicle 100 to the server 200 (for example, a digital twin system).

The vehicle 100 is connected to the server 200 so as to be able to communicate therewith via a communication line such as the Internet. The number of vehicles 100 that are able to communicate with the server 200 is not limited to one and may be plural. The vehicle 100 includes various sensors such as an image sensor 110, a vehicle speed sensor 120, and a steering angle sensor 130, and the information processing device 150.

The image sensor 110 is an imaging device, such as a camera that is installed on windshield glass at the front portion of the vehicle and that captures an image of an area ahead of the vehicle 100, or a camera that is installed on a trunk lid or a tailgate at the rear portion of the vehicle and that captures an image of an area behind the vehicle. The image captured by the image sensor 110 is output to the information processing device 150.

The vehicle speed sensor 120 is a detection device for detecting the speed of the vehicle 100. For the vehicle speed sensor 120, for example, a wheel speed sensor installed on each wheel of the vehicle 100 for detecting the rotational speed (or the rotation amount) of the wheel can be used. The speed of the vehicle 100 detected by the vehicle speed sensor 120 is output to the information processing device 150 as information related to the behavior of the vehicle 100 (hereinafter referred to as "vehicle behavior information").

The steering angle sensor 130 is a detection device for detecting a steering angle (the rotation angle of the steering wheel from the neutral position) according to the steering operation by the driver of the vehicle 100. The steering angle sensor 130 is attached to, for example, a steering shaft that rotates integrally with a steering wheel (not shown). The steering angle detected by the steering angle sensor 130 is output to the information processing device 150 as the vehicle behavior information.

As a sensor for detecting the vehicle behavior information, an acceleration sensor for detecting the magnitude of an acceleration G applied to the vehicle 100 may be provided. For the acceleration sensor, for example, a triaxial accelerometer that detects the acceleration G of the vehicle 100 in the longitudinal direction, the vehicle width direction, and the vertical direction can be used.

The information processing device 150 is configured to identify a moving object that is present in the surroundings of the vehicle 100 on which the information processing device 150 is mounted and to provide the information to the server 200. The information processing device 150 is typically configured by including a processor, a memory, an input-output interface, and the like. The processor reads out and executes a program stored in the memory to implement all or part of the functions performed by a transmission unit 151, an acquisition unit 152, and an identification unit 153 described below.

The acquisition unit 152 sequentially acquires, from the image sensor 110, a surrounding image of the vehicle 100 captured by the image sensor 110. Further, the acquisition unit 152 acquires, from the vehicle speed sensor 120, the speed of the vehicle 100 detected by the vehicle speed sensor 120 as the vehicle behavior information. Furthermore, the acquisition unit 152 acquires, from the steering angle sensor 130, the steering angle of the vehicle 100 detected by the steering angle sensor 130 as the vehicle behavior information. An in-vehicle network such as a controller area network (CAN) or a local interconnect network (LIN) is used to acquire the surrounding image and the vehicle behavior information.

The identification unit 153 identifies the moving object that is present in the surrounding image of the vehicle 100, based on the chronological change of the surrounding image of the vehicle 100 and the speed of the vehicle 100 and/or the steering angle of the vehicle 100 that are acquired by the acquisition unit 152. Examples of the moving object include those that can move, such as automobiles, motorcycles, bicycles, and pedestrians. A method for identifying the moving object will be described later.

When the moving object is identified by the identification unit 153, the transmission unit 151 transmits data related to the moving object among the data of the surrounding image to the server 200. The data related to the moving object include data necessary for an integration process performed by the server 200 that will be described later, such as positional information (latitude and longitude) and the traveling direction of the moving object.

The server 200 is provided outside the vehicle 100 so as to be able to communicate with the vehicle 100, and can collect various data transmitted from the vehicle 100. For example, the server 200 may be a cloud server configured on the cloud. The server 200 is typically configured by including a processor, a memory, an input-output interface, and the like. The processor reads out and executes a program stored in the memory to implement all or part of the functions performed by a reception unit 210, a storage unit 220, and an integration unit 230 described below.

The reception unit 210 receives data transmitted from the vehicle 100 that are data related to the moving object in the present embodiment. The data related to the moving object that is received by the reception unit 210 are output to the integration unit 230.

The storage unit 220 stores data related to various structures (stationary objects) in the reality space. Typically, the storage unit 220 stores data related to the structure necessary for generating a digital twin in the virtual space that is time-synchronized with the reality space. The data related to the structure may be stored in advance by an input operation of an operator etc. Alternatively, as the data related to the structure, the data provided from a plurality of vehicles 100 connected to the server 200 by a method different from that of the present embodiment may be stored as required. It is desirable that the structures of the data stored in the storage unit 220 include at least a structure whose image is highly likely to be captured by the image sensor 110 of the vehicle 100 while the vehicle 100 is traveling. Examples of the structure include stationary objects that have no possibility of moving, such as buildings (condominiums, pedestrian bridges, etc.), white lines (lane markings, pedestrian crossings, etc.), road signs, and traffic lights.

The integration unit 230 performs a process of integrating the data related to the moving object that is transmitted (provided) from the vehicle 100 and the data related to the structure that is stored in the storage unit 220. Although the method of data integration is not particularly limited, as an example, a method is conceivable in which the data related to the moving object are superimposed on the data related to the structure so that the information equivalent to the overall data of the surrounding image captured by the image sensor 110 of the vehicle 100 in the reality space can be managed on the server 200.

Control

Figure 3:
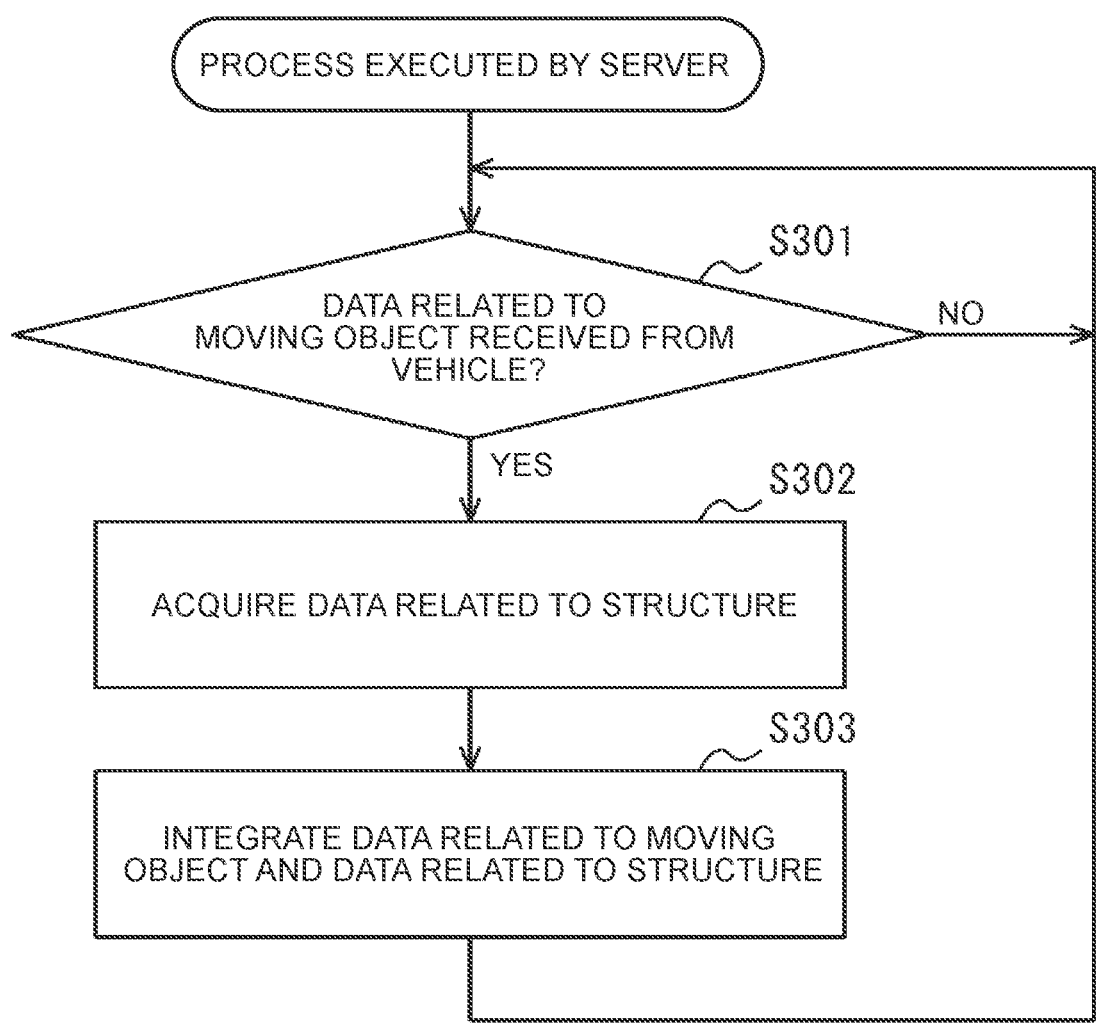
FIG. 3 is a flowchart of a data integration process executed by a server.
Figure 4A:
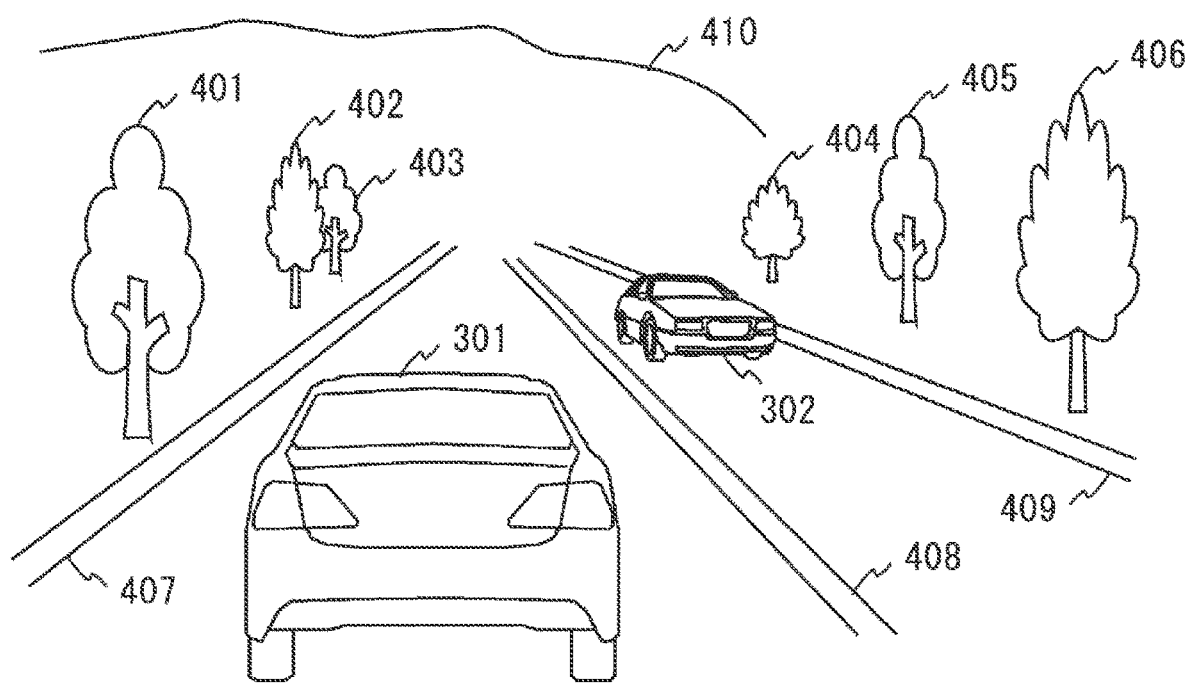
FIG. 4A is an example of a surrounding image of a vehicle.
Figure 4B:
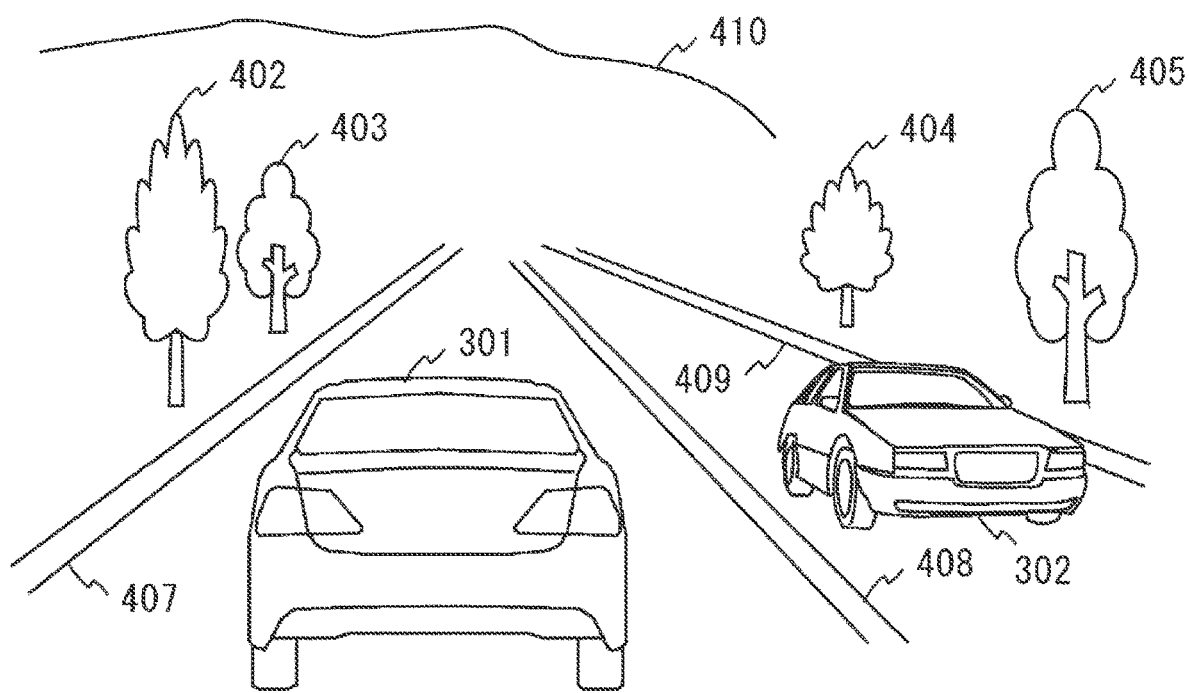
FIG. 4B is an example of the surrounding image of the vehicle.
Figure 4C:
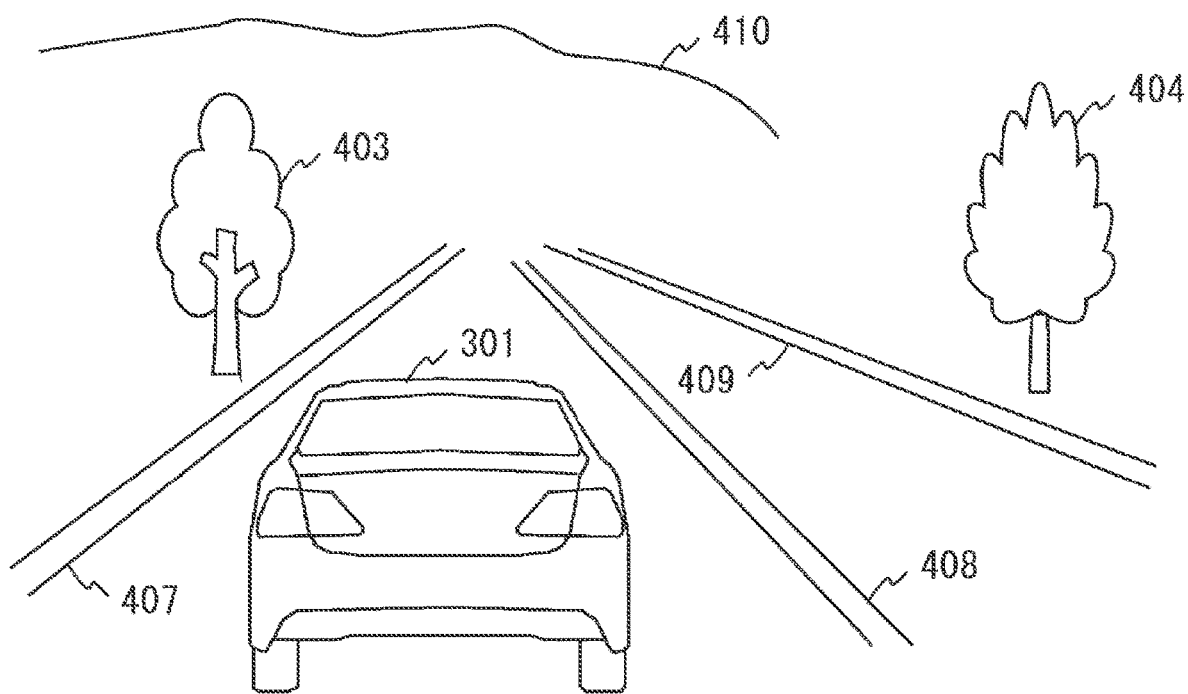
FIG. 4C is an example of the surrounding image of the vehicle.
Figure 5A:
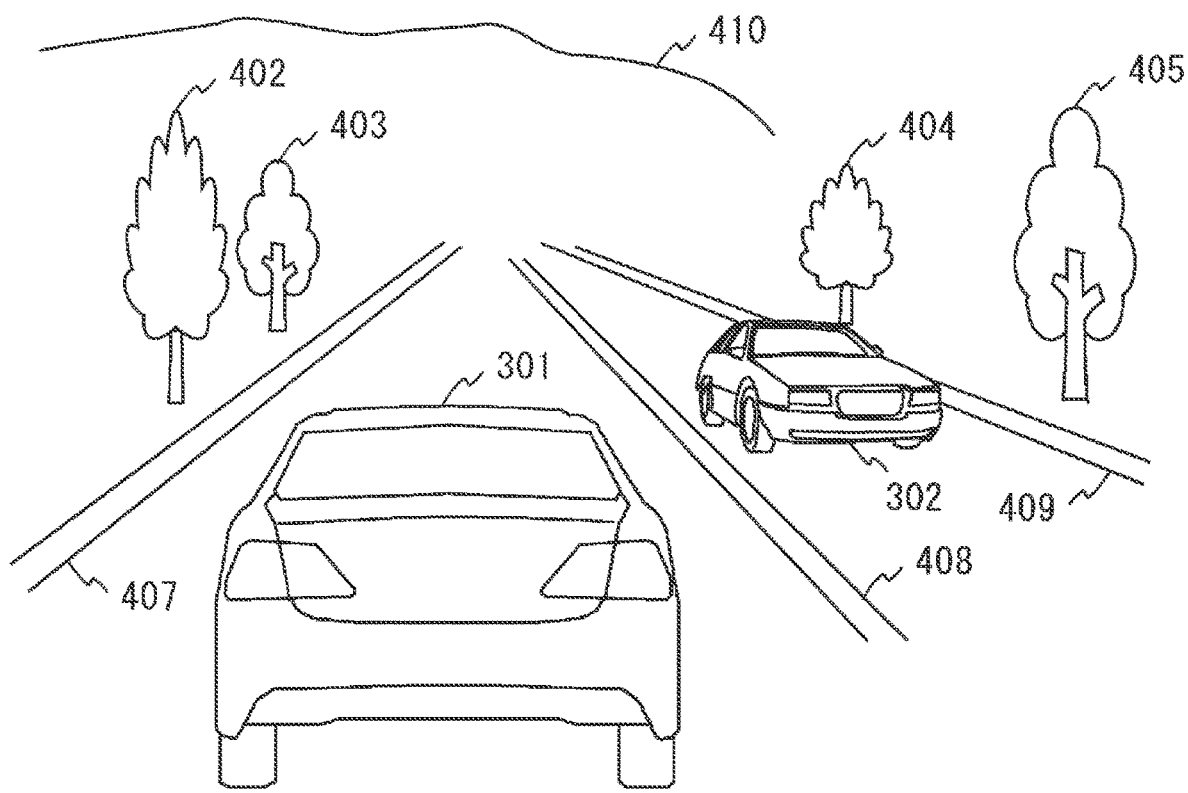
FIG. 5A is an example of an estimated surrounding image of the vehicle.
Figure 5B:
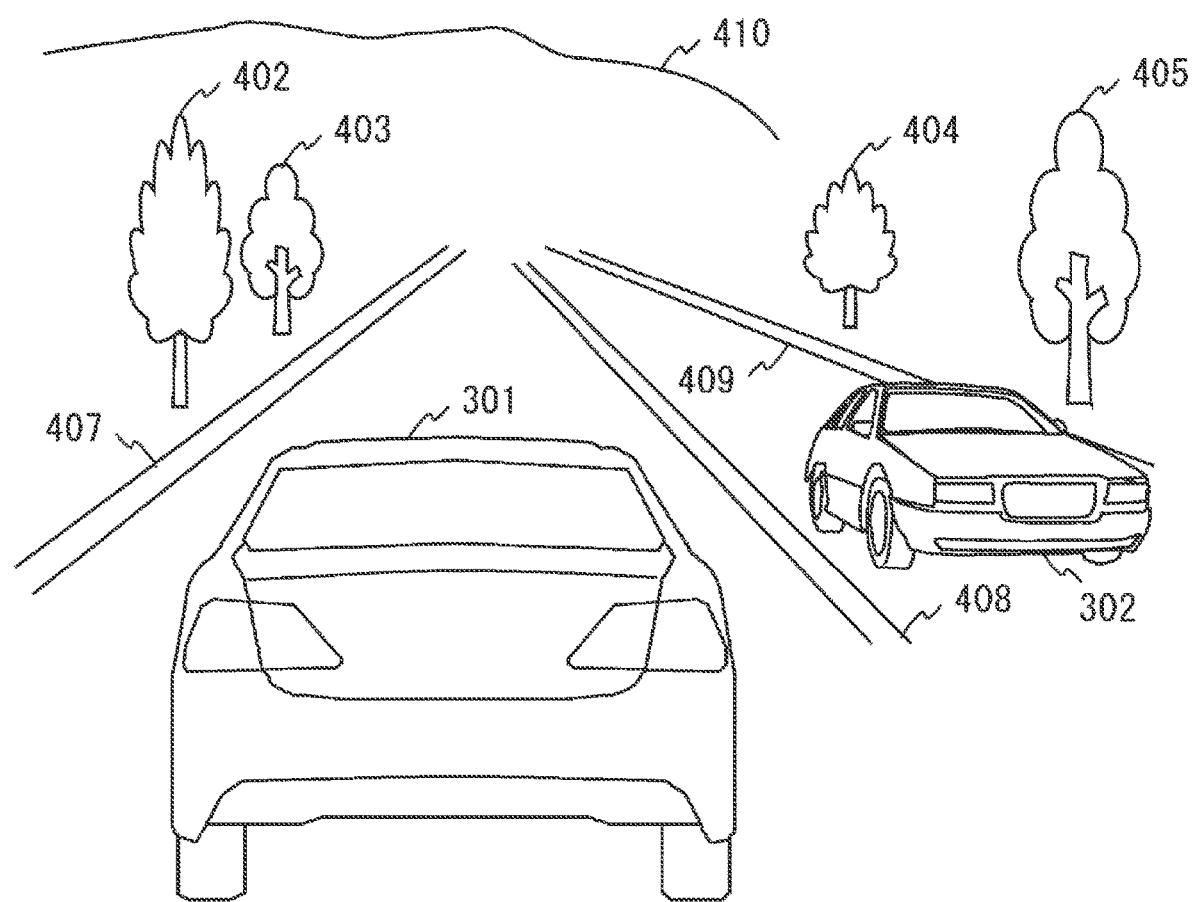
FIG. 5B is an example of the estimated surrounding image of the vehicle.
Figure 6A:
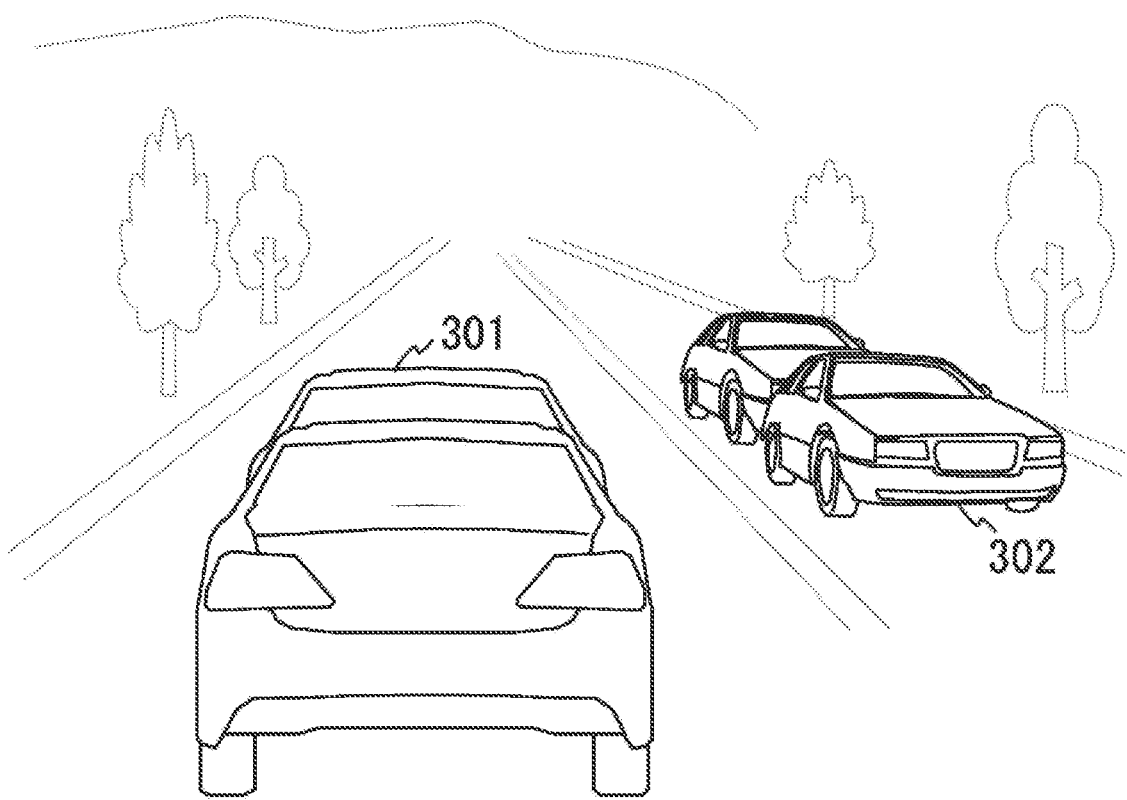
FIG. 6A is an image example of differential data between the surrounding image and the estimated surrounding image.
Figure 6B:
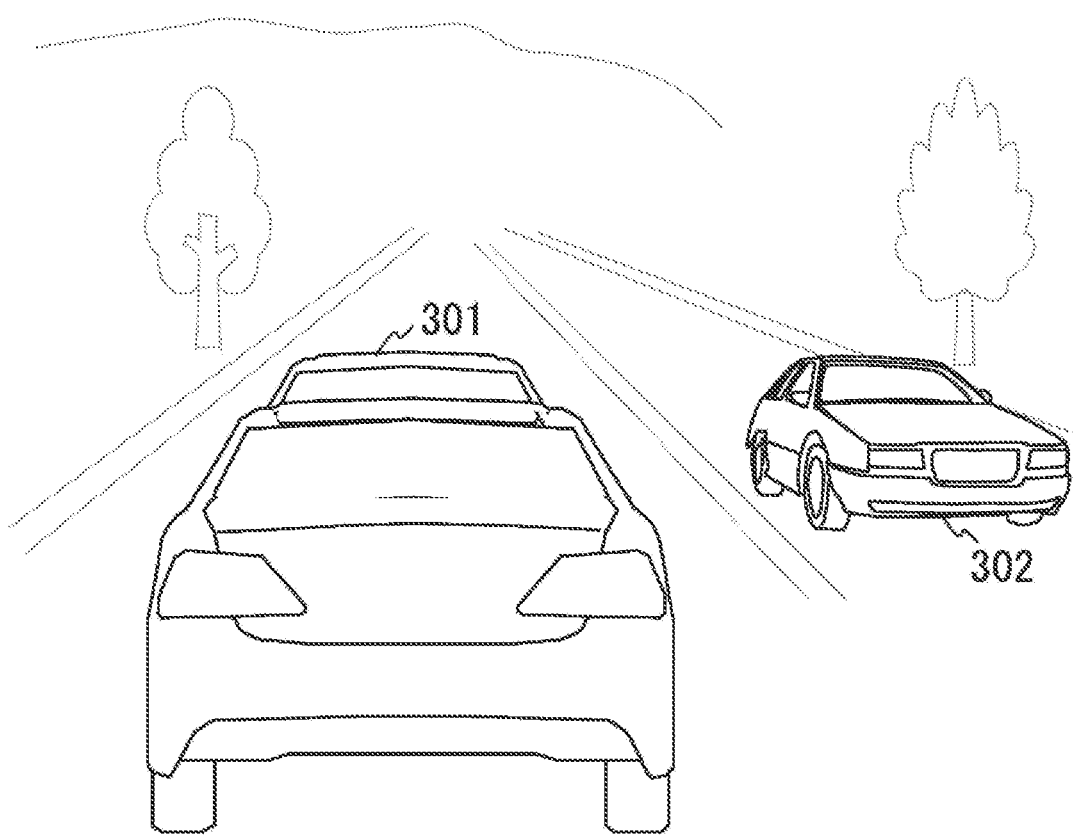
FIG. 6B is an image example of the differential data between the surrounding image and the estimated surrounding image.

Next, with further reference to FIGS. 2A to 2B, FIG. 3, FIGS. 4A to 4C, FIGS. 5A to 5B, and FIGS. 6A to 6B, the process performed by the information processing device 150 and the server 200 according to the present embodiment will be described. FIGS. 2A and 2B are flowcharts illustrating the procedure of a moving object identification process executed by the information processing device 150. The process in FIG. 2A and the process in FIG. 2B are connected by connectors X and Y. FIG. 3 is a flowchart illustrating the procedure of a data integration process executed by the server 200. FIGS. 4A, 4B, and 4C are diagrams showing examples of a real image of the surrounding image of the vehicle 100. FIGS. 5A and 5B are diagrams showing examples of an estimated surrounding image of the vehicle 100 (estimated surrounding image). FIGS. 6A and 6B are examples of a differential data image between the surrounding image and the estimated surrounding image.

(1) Process Executed by Information Processing Device

For example, the moving object identification process illustrated in FIGS. 2A and 2B is started when the ignition switch of the vehicle 100 is turned on (IG-ON), and is repeatedly executed until the ignition switch is turned off (IG-OFF).

Step S201

After the process is started, the acquisition unit 152 of the information processing device 150 acquires, from the image sensor 110, a surrounding image IT of the vehicle 100 at time T and a surrounding image ITt of the vehicle 100 at time [T+Δt] that is the time after a predetermined time Δt has elapsed from the time T. The time T is not particularly limited, but can be any time after the elapse of the time for the operation of the image sensor 110 to stabilize, for example. Further, the predetermined time Δt can be set as appropriate based on the performance of the image sensor 110, the processing capability of the information processing device 150, the frequency and the amount of data requested by the server 200, etc.

FIG. 4A is an example of the surrounding image IT at the time T. In the surrounding image IT at the time T, there are a preceding vehicle 301 traveling ahead of the vehicle 100 and an oncoming vehicle 302 traveling in the oncoming lane as moving objects, and there are trees 401 to 406, lane markings 407 to 409, and a mountain 410 as stationary objects.

FIG. 4B is an example of the surrounding image ITt at the time [T+Δt]. In the surrounding image ITt at the time [T+Δt], in comparison with the surrounding image IT at the time T (FIG. 4A), the positions of the preceding vehicle 301 traveling at approximately the same speed as the vehicle 100, the straight lane markings 407 to 409, and the distant mountain 410 on the image hardly change, whereas the position of the oncoming vehicle 302 on the image that has a high relative speed with respect to the vehicle 100 changes greatly.

When the acquisition unit 152 acquires the surrounding image IT at the time T and the surrounding image ITt at the time [T+Δt], the process proceeds to step S202.

Step S202

The acquisition unit 152 of the information processing device 150 acquires, from the image sensor 110, a surrounding image IT2t of the vehicle 100 at time [T+2Δt] after a predetermined time 2Δt has elapsed from the time T. The time 2Δt is twice the time Δt (2Δt=Δt+Δt).

FIG. 4C is an example of the surrounding image IT2t at the time [T+2Δt]. In the surrounding image IT2t at the time [T+2Δt], in comparison with the surrounding image IT at the time T (FIG. 4A), the positions of the preceding vehicle 301 traveling at approximately the same speed as the vehicle 100, the straight lane markings 407 to 409, and the distant mountain 410 on the image hardly change as with the surrounding image ITt at the time [T+Δt] (FIG. 4B), whereas the position of the oncoming vehicle 302 on the image that has a high relative speed with respect to the vehicle 100 changes even greater than in the surrounding image ITt at the time [T+Δt] (FIG. 4B).

When the acquisition unit 152 acquires the surrounding image IT2t at the time [T+2Δt], the process proceeds to step S203.

Step S203

The acquisition unit 152 of the information processing device 150 acquires the vehicle behavior information (the vehicle speed and the steering angle) from the vehicle speed sensor 120 and/or the steering angle sensor 130. The vehicle behavior information acquired here is information related to the behavior of the vehicle 100 from the time T to the time [T+Δt] and from the time [T+Δt] to the time [T+2Δt]. For example, information that the vehicle 100 ran at 20 km/h for the time 2Δt, and/or information that the steering wheel was turned clockwise by 10 degrees for the time 2Δt. The vehicle behavior information acquired by the acquisition unit 152 may be at least one of the speed and the steering angle of the vehicle 100. After the vehicle behavior information is acquired by the acquisition unit 152, the process proceeds to step S204.

Step S204

Based on the vehicle behavior information acquired by the acquisition unit 152, the identification unit 153 of the information processing device 150 estimates a surrounding image ITt' obtained after the time Δt has elapsed from the surrounding image IT of the vehicle 100 at the time T. More specifically, the estimated surrounding image ITt' is an image showing estimated positions of the plurality of targets to which the targets are predicted to move based on the behavior of the vehicle 100, in a case where the targets captured in the surrounding image IT are all assumed to be structures (stationary objects), since the image sensor 110 moves along with the vehicle 100 when the vehicle 100 remains in the same state (traveling at 20 km/h or turning right with a 10-degree turn) during the time Δt. It should be noted that structures such as the lane markings 407 to 409 and the mountain 410 are excluded from the targets of the subject. For such structures, it is possible to clearly determine from the surrounding image that they are reasonably defined as stationary objects.

FIG. 5A is an example of the estimated surrounding image ITt' after the time Δt. In the estimated surrounding image ITt', the preceding vehicle 301 and the oncoming vehicle 302 are also processed as stationary objects. Therefore, their positions have moved in the same manner as the trees 401 to 406.

When the identification unit 153 estimates the surrounding image ITt' after the time Δt from the surrounding image IT, the process proceeds to step S205.

Step S205

Based on the vehicle behavior information acquired by the acquisition unit 152, the identification unit 153 of the information processing device 150 estimates a surrounding image IT2t' obtained after the time Δt has further elapsed from the surrounding image ITt of the vehicle 100 at the time [T+Δt], in other words, after the time 2Δt has elapsed from the surrounding image IT of the vehicle 100 at the time T. More specifically, the estimated surrounding image IT2t' is an image showing estimated positions of the plurality of targets to which the targets are predicted to move based on the behavior of the vehicle 100, in a case where the targets captured in the surrounding image ITt are all assumed to be structures (stationary objects), since the image sensor 110 moves along with the vehicle 100 when the vehicle 100 remains in the same state (traveling at 20 km/h or turning right with a 10-degree turn) during the time Δt. It should be noted that structures such as the lane markings 407 to 409 and the mountain 410 are excluded from the targets of the subject. For such structures, it is possible to clearly determine from the surrounding image that they are reasonably defined as stationary objects.

FIG. 5B is an example of the estimated surrounding image IT2t' after the time 2Δt. In the estimated surrounding image IT2t', the positions of the preceding vehicle 301, the oncoming vehicle 302, and the trees 401 to 406 that are processed as stationary objects have further moved compared to the estimated surrounding image ITt' after the time Δt (FIG. 5A).

When the identification unit 153 estimates the surrounding image IT2t' after the time Δt from the surrounding image ITt (that is, after the time 2Δt from the surrounding image IT), the process proceeds to step S206.

Step S206

The identification unit 153 of the information processing device 150 performs a predetermined differential process between the surrounding image ITt of the vehicle 100 at the time [T+Δt] and the estimated surrounding image ITt' after the time Δt from the surrounding image IT. In the differential process, for example, the surrounding image ITt and the estimated surrounding image ITt' are compared to determine the positional deviation of each target.

FIG. 6A is an image diagram of the result of the differential process that is performed between the surrounding image ITt shown in FIG. 4B and the estimated surrounding image ITt' after the time Δt shown in FIG. 5A. As shown in FIG. 6A, by the comparison of the surrounding image ITt with the estimated surrounding image ITt', the differential result will be obtained only for the preceding vehicle 301 and the oncoming vehicle 302 that are moving.

When the identification unit 153 executes the differential process between the surrounding image ITt and the estimated surrounding image ITt', the process proceeds to step S207.

Step S207

The identification unit 153 of the information processing device 150 performs the predetermined differential process between the surrounding image IT2t of the vehicle 100 at the time [T+2Δt] and the estimated surrounding image IT2t' after the time 2Δt from the surrounding image IT (after the time Δt from the surrounding image ITt). In the differential process, for example, the surrounding image IT2t and the estimated surrounding image IT2t' are compared to determine the positional deviation of each target.

FIG. 6B is an image diagram of the result of the differential process that is performed between the surrounding image IT2t shown in FIG. 4C and the estimated surrounding image IT2t' after time 2Δt shown in FIG. 5B. As shown in FIG. 6B, by the comparison of the surrounding image IT2t with the estimated surrounding image IT2t', the differential result will be obtained only for the preceding vehicle 301 and the oncoming vehicle 302 that are moving.

When the identification unit 153 executes the differential process between the surrounding image IT2t and the estimated surrounding image IT2t', the process proceeds to step S208.

Step S208

Based on the result of the differential process between the surrounding image ITt and the estimated surrounding image ITt' and the result of the differential process between the surrounding image IT2t and the estimated surrounding image IT2t', the identification unit 153 of the information processing device 150 extracts the targets that are moving and identifies the extracted targets as the moving objects. For example, for a target that is a structure (stationary object), the amount of movement that can be obtained by the differential process falls within a predetermined range (including zero). On the other hand, for a target that is a moving object, the amount of movement that can be obtained by the differential process is extremely small (preceding vehicle 301 etc.), or the amount of movement that can be obtained by the differential process is extremely large (oncoming vehicle 302 etc.). Therefore, it is possible to identify a target whose position is moving out of the predetermined range as a moving object. The predetermined range can be set as desired based on the vehicle behavior information, the performance of the information processing device 150, etc. When the moving object is identified by the identification unit 153, the process proceeds to step S209.

Step S209

For the moving object identified by the identification unit 153, the transmission unit 151 of the information processing device 150 transmits, to the server 200, the data related to the moving object among the data of the surrounding image (the differential data between the surrounding image IT and the surrounding image IT2t in consideration of the amount of movement of the moving object etc.). In the present embodiment, only data related to the moving object in which data related to the stationary object are excluded are transmitted from the information processing device 150 (vehicle 100) to the server 200. When the data related to the moving object are transmitted to the server 200 by the transmission unit 151, the process proceeds to step S210.

Step S210

The acquisition unit 152 of the information processing device 150 replaces (substitutes) the time [T+Δt] with the time T and replaces (substitutes) the time [T+2Δt] with the time T[T+Δt] in order to identify the moving object in the surrounding image at the next time, and the process proceeds to step S202. Afterwards, by this process, the differential process between the surrounding image ITt and the estimated surrounding image ITt' and the differential process between the surrounding image IT2t and the estimated surrounding image IT2t' are repeatedly performed at intervals of the time Δt.

(2) Process Executed by Server

For example, the data integration process illustrated in FIG. 3 is started when the server 200 establishes communication with the vehicle 100, and is repeatedly executed until the communication with the vehicle 100 is terminated (interrupted).

Step S301

The reception unit 210 of the server 200 determines whether the data related to the moving object have been received from the vehicle 100 (information processing device 150). When the reception unit 210 has received the data related to the moving object from the vehicle 100 (YES in step S301), the process proceeds to step S302.

Step S302

The integration unit 230 of the server 200 acquires data related to the structure from the storage unit 220. The data related to the structure acquired by the integration unit 230 need not be all the data stored in the storage unit 220, and may be only data on the structure related to the surrounding of the vehicle 100 in which the reception unit 210 has received the data related to the moving object in the above step S301. In this case, the vehicle 100 may transmit, to the server 200, the data etc. showing the location (latitude and longitude) where the moving object has been identified along with the data related to the moving object. When the data related to the structure are acquired by the integration unit 230, the process proceeds to step S303.

Step S303

The integration unit 230 of the server 200 integrates the data related to the moving object received from the vehicle 100 and the data related to the structure acquired from the storage unit 220. After the data related to the moving object are integrated with the data related to the structure by the integration unit 230, the process proceeds to step S301 to integrate the next data related to the moving object that is received from the vehicle 100 (information processing device 150).

Operations, Effects, etc.

As described above, in the information processing device 150 according to the embodiment of the present disclosure, the surrounding image of the vehicle 100 is acquired from the image sensor 110, the information related to the behavior of the vehicle 100 (vehicle speed and steering angle) is acquired from the vehicle speed sensor 120 and the steering angle sensor 130, and the moving object in the surrounding image of the vehicle 100 is identified based on the chronological change in the surrounding image of the vehicle 100 and the information related to the behavior of the vehicle 100. In this manner, the information processing device 150 identifies the moving object based on the chronological change of the surrounding image of the vehicle 100 after grasping the movement of the image sensor 110. Therefore, it is possible to identify the moving object with high accuracy even from the surrounding image captured while the vehicle 100 is moving.

Further, in the information processing device 150 according to the present embodiment, only the data related to the moving object among the data of the surrounding image of the vehicle 100 are transmitted to the server 200. The transmission process can reduce the amount of communication data from the vehicle 100 to the server 200, and can implement suppression of communication costs and suppression of delay in communication time.

Furthermore, the server 200 of the present embodiment can generate a digital twin on the server 200 by integrating the data related to the moving object that is received from the vehicle 100 with the data related to the structure that is stored in the server 200.

The embodiment according to the present disclosure has been described above. The present disclosure can be regarded as an information processing device, a method executed by the information processing device including a processor and a memory, a program for executing the method, a non-transitory storage medium that is computer-readable and that stores the program, and a system constituted by a vehicle including the information processing device and a server.

The information processing device according to the present disclosure includes various sensors including an image sensor, and can be used in a vehicle or the like that is connected to the server so as to be able to communicate therewith.

What is claimed is:

1. An information processing device mounted on a vehicle including a sensor comprising a vehicle speed sensor or a vehicle steering sensor, the information processing device comprising:
 a memory storing non-transitory computer-executable instructions, and a processor configured to execute the instructions to:
 acquire
   a reference surrounding image of the vehicle at a reference time,
   a first surrounding image at a first time after a predetermined time has elapsed from the reference time, and
   a second surrounding image at a second time after the predetermined time has further elapsed from the first time;
 acquire information related to a behavior of the vehicle from the sensor;
 estimate, based on the vehicle behavior information, a first estimated surrounding image after the predetermined time from the reference surrounding image, and a second estimated surrounding image after the further predetermined time from the first surrounding image,
 identify a moving object in the surrounding images of the vehicle based on a predetermined differential process between the first surrounding image and the first estimated surrounding image, and between the second surrounding image and the second estimated surrounding image, and
 transmit via an input/output interface, data related to the identified moving object among data of the surrounding images of the vehicle to a remote server.

2. The information processing device according to claim 1, wherein the information related to the behavior of the vehicle is at least one of a speed of the vehicle and a steering angle of the vehicle.

3. A system comprising:
 an information processing device mounted on a vehicle including a sensor comprising a vehicle speed sensor or a vehicle steering sensor; and
 a server that is able to communicate with the information processing device, wherein
 the information processing device includes
 a memory storing non-transitory computer-executable instructions, and a processor configured to execute the instructions to:
 acquire
   a reference surrounding image of the vehicle at a reference time,
   a first surrounding image at a first time after a predetermined time has elapsed from the reference time, and
   a second surrounding image at a second time after the predetermined time has further elapsed from the first time;
 acquire information related to a behavior of the vehicle from the sensor,
 estimate, based on the vehicle behavior information, a first estimated surrounding image after the predetermined time from the reference surrounding image, and a second estimated surrounding image after the further predetermined time from the first surrounding image,
 identify a moving object in the surrounding images of the vehicle based on a predetermined differential process between the first surrounding image and the first estimated surrounding image, and between the second surrounding image and the second estimated surrounding image, and
 transmit data related to the moving object among data of the surrounding images of the vehicle to the server, and
 the server includes a second memory storing non-transitory computer-executable instructions, and a second processor configured to execute the instructions to:
   receive the data related to the moving object from the information processing device,
   store data related to a structure included in the surrounding images of the vehicle, and
   integrate the data related to the moving object and the data related to the structure.

4. The system according to claim 3, wherein the information related to the behavior of the vehicle is at least one of a speed of the vehicle and a steering angle of the vehicle.

5. The system according to claim 3, wherein a digital twin is provided in a virtual space that is time-synchronized with a reality space, using data obtained by integrating the data related to the moving object and the data related to the structure.

6. A method executed by a computer of an information processing device mounted on a vehicle including a sensor comprising a vehicle speed sensor or a vehicle steering sensor, the method comprising:
- a step of acquiring
  - a reference surrounding image of the vehicle at a reference time,
  - a first surrounding image at a first time after a predetermined time has elapsed from the reference time, and
  - a second surrounding image at a second time after the predetermined time has further elapsed from the first time;
- a step of acquiring information related to a behavior of the vehicle from the sensor; and
- a step of estimating, based on the vehicle behavior information, a first estimated surrounding image after the predetermined time from the reference surrounding image, and a second estimated surrounding image after the further predetermined time from the first surrounding image,
- a step of identifying a moving object in the surrounding images of the vehicle based on a predetermined differential process between the first surrounding image and the first estimated surrounding image, and between the second surrounding image and the second estimated surrounding image, and
- a step of transmitting via an input/output interface, data related to the identified moving object among data of the surrounding images of the vehicle to a remote server.

* * * * *